(12) United States Patent
Lund et al.

(10) Patent No.: US 9,656,773 B2
(45) Date of Patent: May 23, 2017

(54) BOTTLE FILLING/CAPPING METHODS AND APPARATUS

(71) Applicant: Church & Dwight Co., Inc., Princeton, NJ (US)

(72) Inventors: Albert H. Lund, Westfield, NJ (US); Peter Piscopo, Medford, NJ (US)

(73) Assignee: Church & Dwight Co., Inc., Princeton, NJ (US)

( * ) Notice: Subject to any disclaimer, the term of this patent is extended or adjusted under 35 U.S.C. 154(b) by 0 days.

(21) Appl. No.: 14/439,716

(22) PCT Filed: Nov. 1, 2013

(86) PCT No.: PCT/US2013/068002
§ 371 (c)(1),
(2) Date: Apr. 30, 2015

(87) PCT Pub. No.: WO2014/071154
PCT Pub. Date: May 8, 2014

(65) Prior Publication Data
US 2015/0291297 A1    Oct. 15, 2015

Related U.S. Application Data

(60) Provisional application No. 61/721,402, filed on Nov. 1, 2012.

(51) Int. Cl.
| | |
|---|---|
| B65G 47/00 | (2006.01) |
| B65B 43/50 | (2006.01) |
| B65G 47/84 | (2006.01) |
| B67B 3/20 | (2006.01) |
| B67C 3/24 | (2006.01) |

(52) U.S. Cl.
CPC ............ *B65B 43/50* (2013.01); *B65G 47/846* (2013.01); *B67B 3/2033* (2013.01); *B67C 3/242* (2013.01); *B65G 2205/06* (2013.01)

(58) Field of Classification Search
CPC ....... B65G 47/84–47/848; B65B 43/50; B67B 3/2033
USPC ................ 198/803.2–803.11, 867.01–867.15
See application file for complete search history.

(56) References Cited

U.S. PATENT DOCUMENTS

| | | |
|---|---|---|
| 1,565,371 A | 12/1925 | Kendall |
| 2,607,106 A | 4/1946 | Robert |
| 2,614,681 A | 10/1952 | Keil |
| 3,004,650 A | 10/1961 | Pettee |
| 4,697,691 A | 10/1987 | Zodrow et al. |
| 4,939,890 A | 7/1990 | Peronek et al. |
| 7,775,381 B2 * | 8/2010 | Monti .................... B65G 29/00 141/165 |

(Continued)

FOREIGN PATENT DOCUMENTS

| | | |
|---|---|---|
| EP | 0306137 A1 | 3/1989 |
| GB | 484614 A | 3/1938 |
| JP | 10-338297 A | 12/1998 |

*Primary Examiner* — William R Harp
(74) *Attorney, Agent, or Firm* — Church & Dwight Co., Inc.

(57) ABSTRACT

A bottle handling apparatus handles bottles (50) of a nominal neck (70) radius. The apparatus has a carrier (140) and a plurality of bottle guides (100; 180; 200) mounted to the carrier and each comprising a bottle-engaging recess (110). The bottle-engaging recess accommodates necks of different eccentricities.

16 Claims, 8 Drawing Sheets

(56) References Cited

U.S. PATENT DOCUMENTS

| | | | |
|---|---|---|---|
| 7,967,127 B2* | 6/2011 | Spence | B65G 47/847 198/459.2 |
| 8,172,290 B2* | 5/2012 | Nishino | A61L 2/087 198/803.7 |
| 2003/0154694 A1* | 8/2003 | Peronek | B65B 7/2835 53/490 |
| 2007/0271871 A1 | 11/2007 | Spence et al. | |
| 2009/0101682 A1 | 4/2009 | Szekely et al. | |
| 2010/0077703 A1* | 4/2010 | Gourlaouen | B65G 47/847 53/473 |

* cited by examiner

BOTTLE FILLING/CAPPING METHODS AND APPARATUS

CROSS-REFERENCE TO RELATED APPLICATIONS

Benefit is claimed of International Patent Application No. PCT/US2013/068802 which was filed Nov. 1, 2013 and of U.S. Provisional Patent Application No. 61/721,402 which was filed Nov. 1, 2012. Both above-mentioned applications are entitled "Bottle Filling/Capping Methods and Apparatus" and their disclosures are hereby incorporated by reference in their entirety.

BACKGROUND OF THE INVENTION

The invention relates to bottle filling/capping. More particularly, the invention relates to methods and apparatus for positioning, a bottle neck during filling and/or capping.

An exemplary bottle filling/capping method and apparatus is illustrated in the context of a laundry detergent bottle. However, it may apply to other bottles.

In an exemplary bottle filling/capping process, bottles move along a flowpath through a series of operations. Exemplary operations may include filling, cap applying, labeling, inspection, and the like.

These may be further subdivided. For example, with laundry detergent bottles, capping may, involve a two-step process of first installing a spout fitment and then installing a cap. Alternatively, the spout fitment may be installed prior to filling. One exemplary group of bottles is shown in US Pre-Grant Publication No. 2009/0101682A1, the disclosure of which is incorporated by reference in its entirety as if set forth at length.

At various points along the flowpath, the bottles may need to be precisely positioned. One example involves positioning the bottle at capping where filled bottles (optionally with spout fitments preinstalled) receive caps and the caps are screwed down. More particularly, the cap may be screwed to a pre-installed spout fitment or the spout fitment with cap pre-installed may be screwed onto the bottle or snapped onto the bottle. In yet further variations, spout fitment pre-installation may be internal so that the cap screws onto the bottle.

To the extent that the bottles are not centered relative to the cap being delivered, the cap may fail to be properly installed and may damage the bottle and/or foul the assembly line. It is, therefore, desirable that the capping station precisely register the bottle relative to the cap being installed.

For registering the bottles, it is known to use a guide wheel having a circumferential array of guide members for engaging the bottle. The wheel rotates with the flowpath passing tangentially by or around the wheel so that at least one guide member may engage a bottle adjacent one or more associated capping tools. Exemplary capping tools each comprise one or more actuators for downwardly inserting the cap and rotating the cap to tighten it.

The exemplary guides have recesses nearly semicircular in planform (e.g., a circular arc in the vicinity of 180°).

SUMMARY OF THE INVENTION

One aspect of the disclosure involves a bottle handling apparatus for handling bottles of a nominal neck radius. The apparatus has a carrier and a plurality of bottle guides mounted to the carrier and each comprising a bottle-engaging recess. The bottle-engaging recess comprises means for accommodating necks of different eccentricities.

A further embodiment may additionally and/or alternatively include the means comprising a central concave region of a radius of curvature less than the nominal neck radius and regions outboard of the central region on opposite sides thereof having less concavity than the central region.

A further embodiment may additionally and/or alternatively include the means comprising means for providing two circumferentially-spaced contact locations 80-100° from each other with a circular neck of said nominal neck radius.

A further embodiment may additionally and/or alternatively include the means comprising means for providing two circumferentially-spaced contact locations separated by a non-contact gap of at least 45° with a circular neck of said nominal neck radius.

A further embodiment may additionally and/or alternatively include a method for using the apparatus. The method comprises: passing a plurality of the bottle bodies along a flowpath; and actuating the carrier to engage the guides to the bottle bodies as the bottle bodies in the flowpath pass the carrier, the engagement engaging the bottle neck to the guide recess.

A further embodiment may additionally and/or alternatively include the engagement providing two circumferentially-spaced contact locations 80-100° from each other with a circular neck of said nominal neck radius.

A further embodiment may additionally and/or alternatively include a circumferential outer rail providing a third contact location.

A further embodiment may additionally and/or alternatively include the engagement providing two circumferentially-spaced contact locations separated by a non-contact gap of at least 45° with a circular neck of said nominal neck radius.

A further embodiment may additionally and/or alternatively include the actuating comprising rotating the carrier.

A further embodiment may additionally and/or alternatively include aligning the guide to a chuck.

A further embodiment may additionally and/or alternatively include: as a first bottle passes through the apparatus, there are two spaced-apart contact locations with the guide; as a second bottle passes through the apparatus, the second bottle neck having a greater eccentricity than the first bottle neck, there are two contact locations with the guide shifted outward along the guide recess; and as a third bottle passes through the apparatus, the third bottle neck having a greater eccentricity than the second bottle neck, there are two contact locations with the guide shifted further outward along the guide recess.

A further embodiment may additionally and/or alternatively include the second bottle having at least 5% eccentricity and a center of the second bottle shifts radially relative to a center of the first bottle by no more than 2% of a nominal neck diameter of the first bottle, more particularly, no more than 1%.

Another aspect of the disclosure involves a bottle handling apparatus for handling bottles of a nominal neck (70) radius. The apparatus comprises: a carrier; and a plurality of bottle guides mounted to the carrier and each comprising a bottle-engaging recess, wherein the bottle-engaging recess comprises: a central concave first region of a radius of curvature less than the nominal neck radius; and second regions outboard of the central region on opposite sides thereof being less concave than the central region.

A further embodiment may additionally and/or alternatively include: the second regions have curvature magnitude at least 5 times the nominal neck radius; and the second regions are positioned to contact the neck for eccentricities from zero (circularity) to at least 5% (more particularly at least 10% or at least 15%).

A further embodiment may additionally and/or alternatively include the second regions outboard having curvature magnitude at least 10 times the nominal neck radius.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
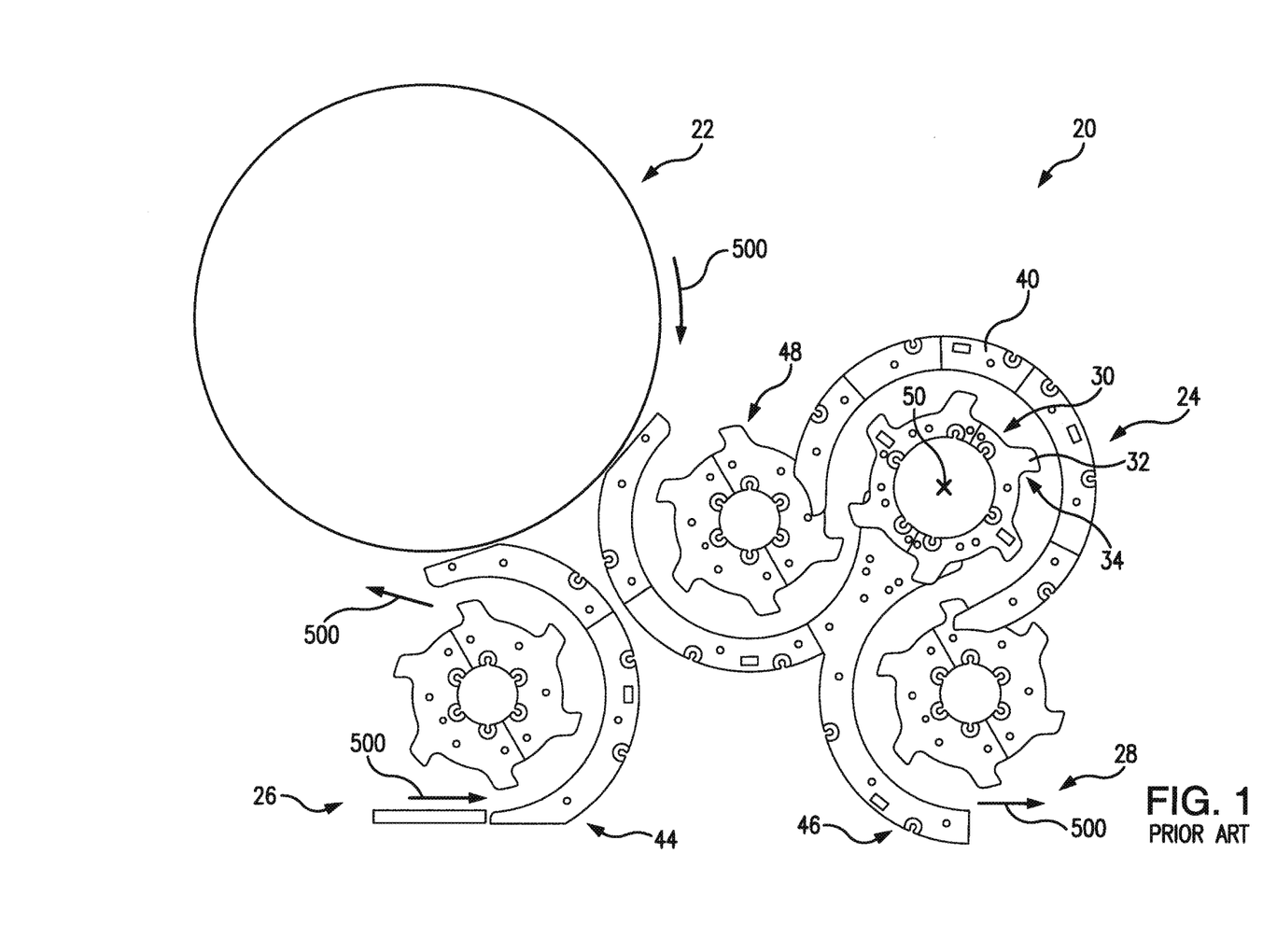
FIG. 1 is a partial, partially schematic, view of a prior art filling/capping line.

FIG. 1 shows filling/capping system 20 comprising a filling station (filler) 22 and a capping station (capper) 24. Bottles 50 move in a downstream direction 500 along a bottle flowpath 502 through the system. The exemplary capping station 24 includes a rotating wheel or star 30 mounted for rotation about an axis 510. The exemplary wheel is known as a star with perimeter protrusions 32 defining perimeter pockets 34 for engaging bottle necks as the bottles move along the line. Bottle body 52 (FIG. 5) bases may be accommodated in pockets (not shown) in conveyors at one or more locations along the bottle flowpath between the inlet 26 and outlet 28.

The exemplary capping station 24 further includes a perimeter rail 40 limiting potential outward radial excursions of the bottle (e.g., due to, vibration, centrifugal force, or the like). One or more additional stations may have similar stars and rails. These include an exemplary in-feed station 44 upstream, an exemplary discharge station 46 at the outlet, and an exemplary transfer station 48 between the filler and the capper. In this exemplary embodiment, and as discussed below, the star of the capper is placed higher than the other stars so that the capper star engages a bottle neck whereas the other stars engage bottle shoulders. The filler may also include such features. The star direction of rotation is such that the bottles moving along the perimeter move downstream along the bottle flowpath.

Figure 2:
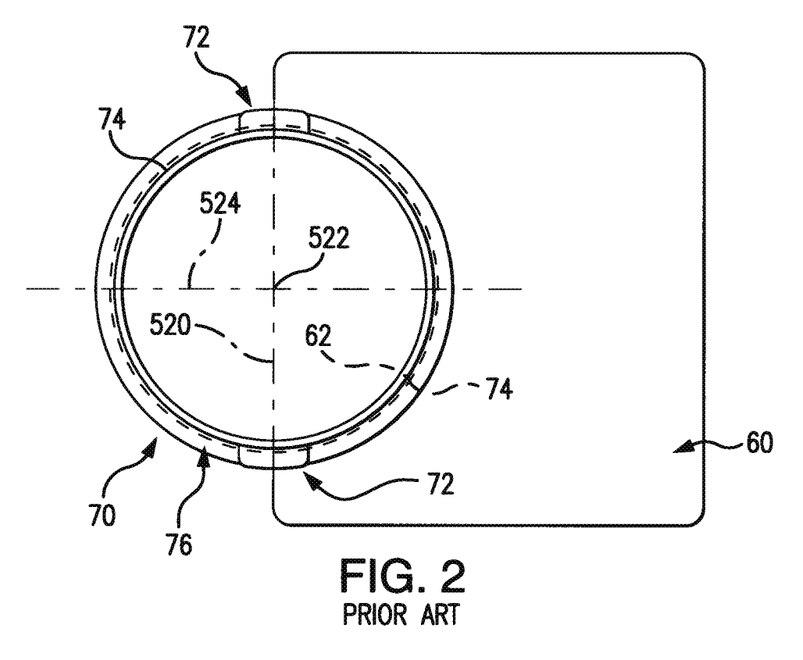
FIG. 2 is a view of a prior art bottle guide which may be applied as a modification to the line of FIG. 1.

FIG. 2 shows a bottle neck guide 60. A circumferential array of such neck guides may be mounted to the capper wheel 30 as a carrier in lieu of projections 32. The exemplary neck guide 60 may be formed of a metallic plate (e.g., stainless steel or, aluminum) and has an exemplary radially outwardly-open semi-circular recess 62 for receiving the bottle neck. The exemplary semi-circular recess 62 is of essentially the same radius of curvature as the bottle neck is. For example, an exemplary neck outer diameter (OD) of one nominal bottle size is 2.800 inches.

FIG. 2 also shows the bottle neck 70. It also shows a bottle mold parting plane 520. This exemplary bottle also has a pair of diametrically opposed neck lugs 72 protruding from the outer circular surface 74 of the neck above the guide (and from a flange 76). The surface 74 below the flange is shown in broken lines and may be of like diameter or slightly smaller or larger than above the flange.

FIG. 2 also shows a bottle neck center 522 (and neck central vertical axis) and a vertical radial plane 524 which intersects the wheel rotational axis 510 and intersects the bottle neck central vertical axis 522. The parting plane 520 is circumferential/tangential relative to the wheel axis of rotation 510.

With exemplary nearly semicircular guide recesses, problems arise with bottle necks departing from perfect or near-perfect circularity. The neck may have a designed nominal size (diameter or radius). However, artifacts of the molding process will cause a spectrum of departures from perfect circularity for a given nominal neck size. One typical artifact is that the neck planform/cross-section will be somewhat elliptical, lengthening along the mold parting plane and narrowing transverse thereto. The overall circumference may remain essentially the same as that of the nominal perfect circle but the planform will be longer than the nominal diameter parallel to the mold parting plane and smaller than the nominal diameter transverse to the parting plane (e.g., along the minor axis of the ellipse).

The eccentricity, will cause the center of the neck (axis 522 and parting plane 520) to shift radially outward of the guide. This may cause misalignment of the bottle with the capping chuck/clutch. As the chuck descends and attempts to install the cap, it may fail and/or may damage the bottle, spill material, or, the like.

Figure 3:
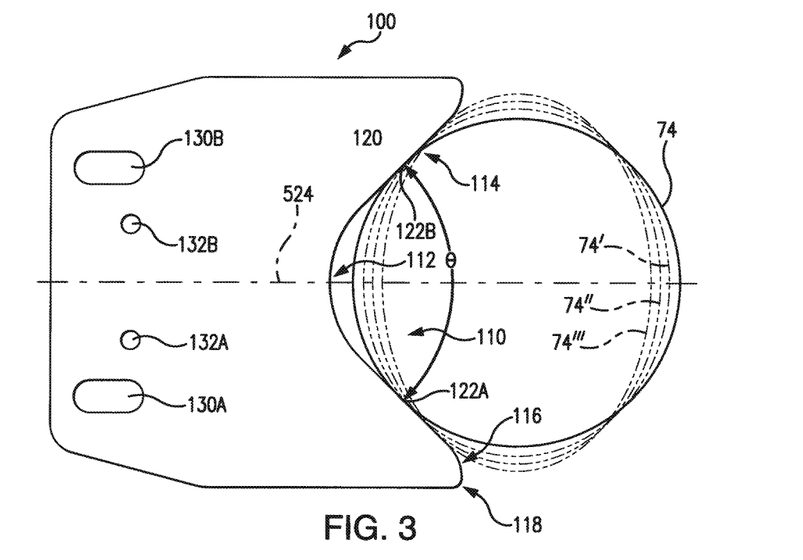
FIG. 3 is a top plan view of a first inventive guide.
Figure 4:
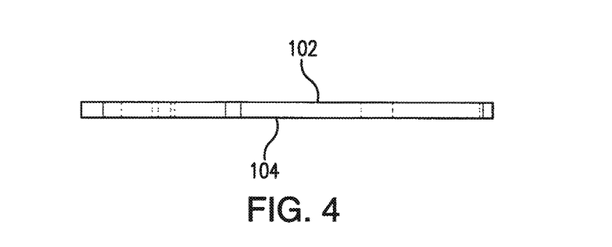
FIG. 4 is a side view of the guide of FIG. 3.

Accordingly, FIGS. 3 and 4 show a revised guide 100 configured to be relatively insensitive to neck, eccentricity. FIG. 3 shows the circular neck of nominal neck outer diameter (OD) surface 74. Necks of progressive eccentricities are shown as 74', 74", and 74'". In this implementation, the eccentric necks are shown as elliptical with the major axis in the parting plane and tangentially oriented. Artifacts of molding will typically register the eccentricity with the parting plane and, more particularly, will cause the major axis to typically be along the parting plane. However, it is seen that the exemplary guide may, reduce sensitivity even where the minor axis is tangential. The tangential orientation of the axis will typically result from the registering of the base of the bottle in its pocket. For example, the exemplary bottle base may be of elongate cross-section (e.g., a rounded rectangle or a near ellipse). The pocket may be complementary to this so that the bottle is always registered with its parting plane tangential when fully seated in the guide or at least when first engaged by the chuck.

The exemplary guide may, as in the prior art, be formed of sheet metal (e.g., aluminum or stainless steel) and has an exemplary thickness between an upper face 102 and a lower face 104 of an eighth of an inch (0.13 inch).

The exemplary outward end of the guide 100 defines a recess 110. An exemplary recess 110 is symmetric across the radial, plane 524 which also forms a center plane of the guide. The recess 110 transitions from a relatively tight inboard/proximal concave region 112 (having relatively low radius of curvature) to an intermediate region 114 having much higher magnitude radius of curvature and finally transitioning to a distal region 116. The exemplary intermediate region is essentially straight but may have slight convexity. This transitions to the distal region which is convex but of lesser magnitude of radius of curvature. For example, this radius of curvature may transition through several steps and may include a lateral portion 118 of relatively tight convexity merely to avoid puncturing or damaging bottles during transfer to the associated guide.

For example, relative to the nominal bottle radius, the exemplary radius of curvature along the region 112 (or some portion thereof) may be at least about 10% less, more particularly, at least about 20% less, or at least about 30% less. In this example, the radius of curvature along the region 112 is 34% less than the nominal bottle radius. Along the region 114, the recess is straight or nearly straight over a substantial distance. Two approximately straight regions 120 are at an exemplary angle 0 of about 90° (more broadly, 80°-100°). For various bottle eccentricities (e.g., with eccentricities shown of up to about 16% for the neck OD 74'''), the two contact points of the neck OD surface will fall along this region.

FIG. 3 shows contact points/locations 122A and 122B for the circular neck and the shifted contact locations of the more eccentric necks shifted slightly radially outward along the regions 114. Exemplary radius of curvature magnitude along the regions 114 is substantially greater than that of the nominal neck (e.g., more than twice or more than five times or more than ten times).

FIG. 3 further shows a first pair of mounting features 130A, 130B on either side of the plane 524 and a second pair of mounting features 132A and 132B spaced inward thereof. The first mounting features are elongate slots parallel to the plane 524. The second features are holes. In mounting the guide to the wheel (carrier 140 of FIG. 5), the guide lower surface may be placed atop the wheel upper surface. Fasteners (e.g., socket head cap screws) may be placed through the holes 130A, 130B into threaded bores in the wheel. The guide may be radially shifted to a desired position and the fasteners tightened or further tightened. For example, in one method of positioning, a bottle is placed in its pocket and the guide is shifted radially to make initial contact with the bottle while the bottle is maintained vertical. At this point of contact, the fasteners may be tightened. If it is desired to further secure the guide (e.g., after any test runs), the holes 132A, 132B may be used as guides to drill into the plate and insert set screws or pins to fix the guide position.

Figure 10:
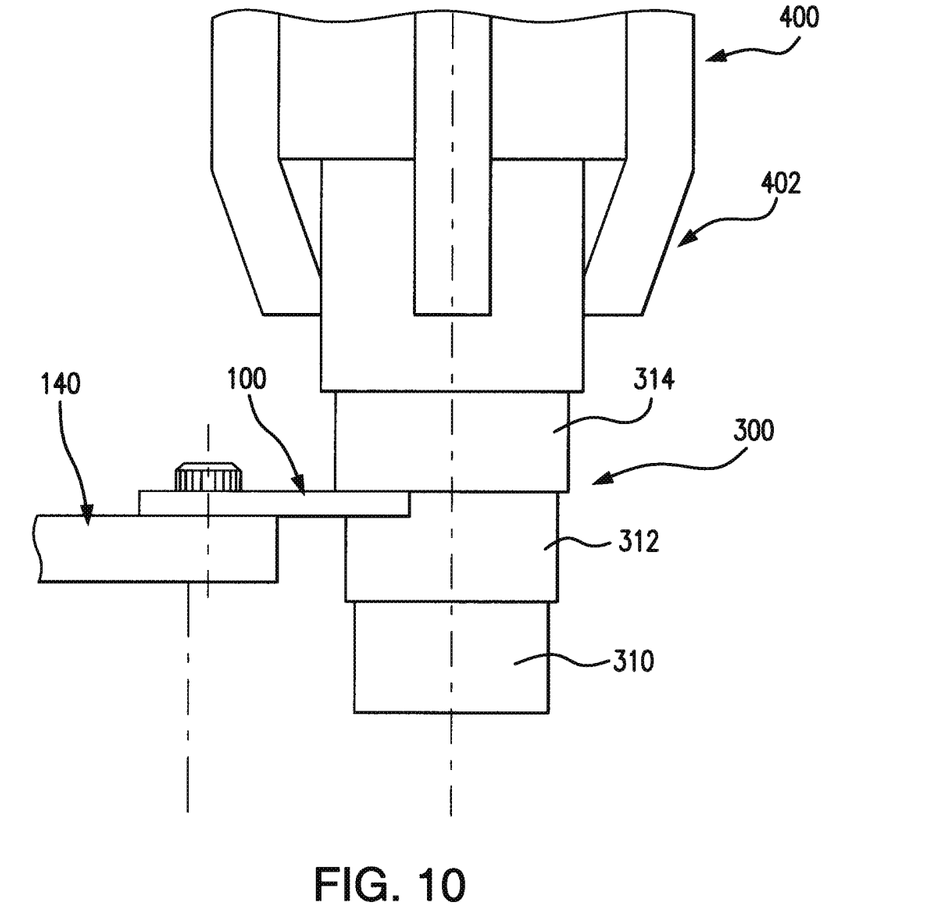
FIG. 10 is a side view of an alignment mandrel or positioning a guide.

In yet another alternative, positioning is not via a bottle but via a mandrel 300 (FIG. 10) inserted into a chuck 402 of the capper 400. The mandrel may have a surface positioned to be contacted by the guide recess when the guide is in a desired alignment. The mandrel may have portions 310, 312, 314 of different diameter corresponding to different bottle nominal neck diameters or separate mandrels may, be used for different bottles.

Yet alternative alignment techniques may be used.

Figure 5:
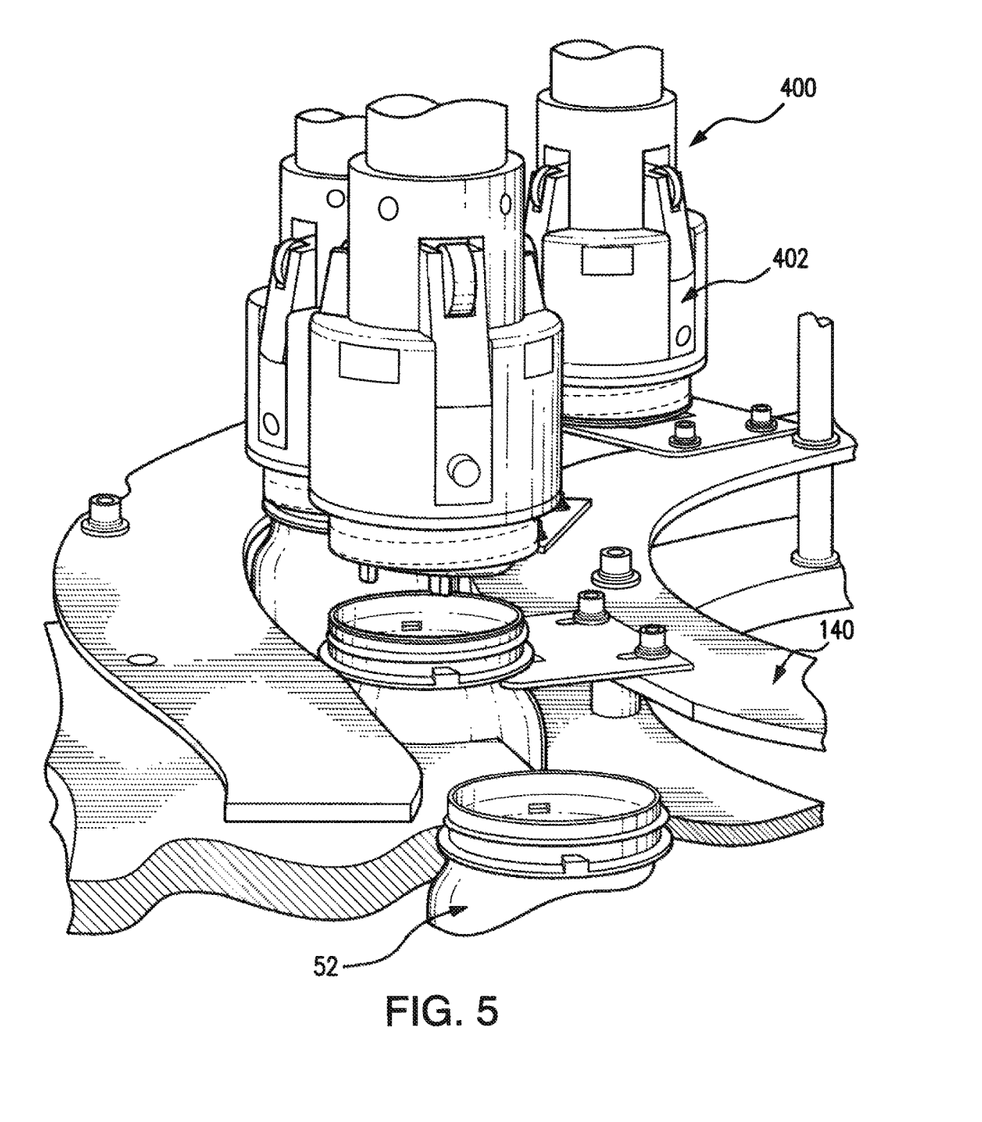
FIG. 5 is a first photograph of a capping line including the guide of FIG. 3.
Figure 6:
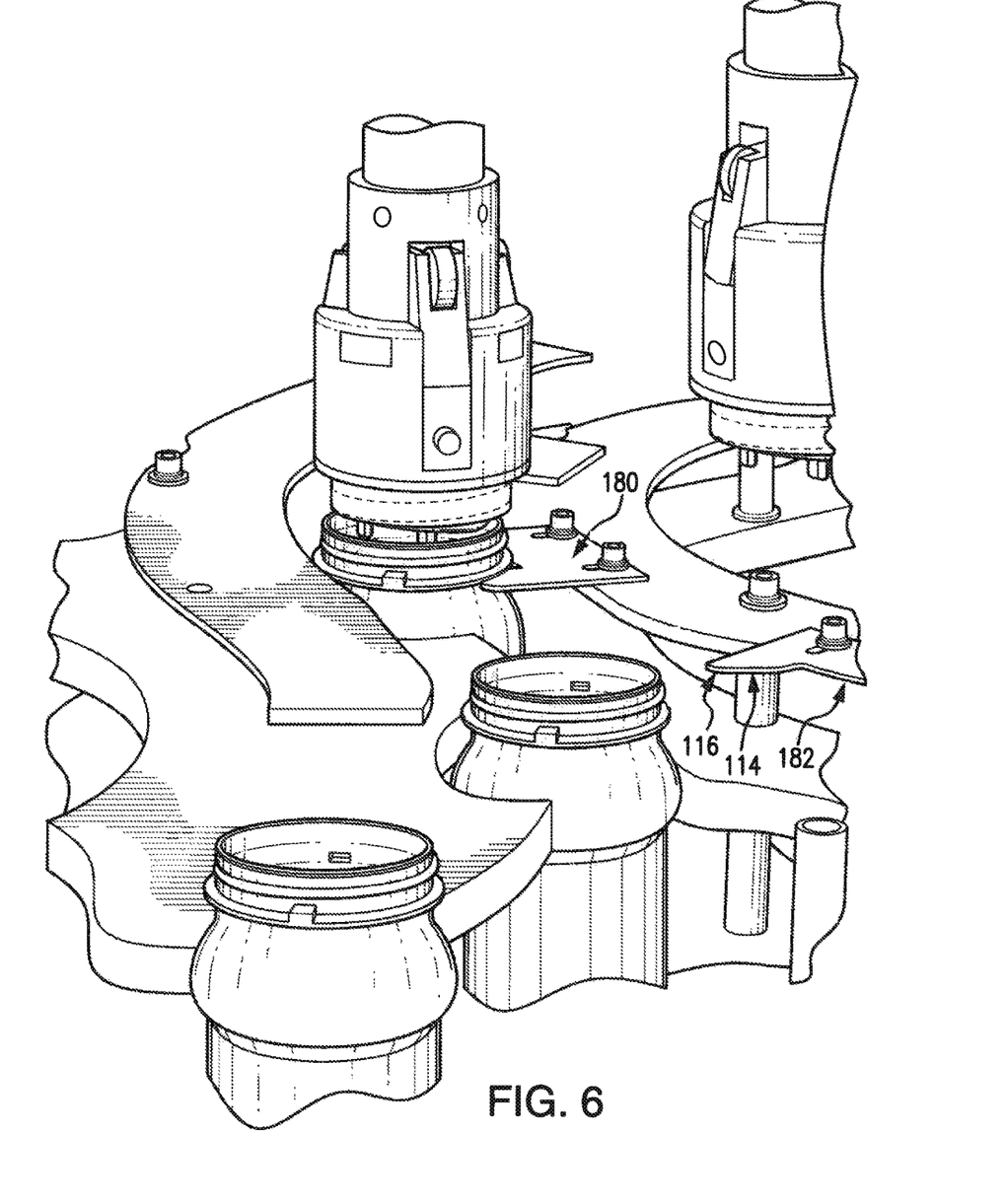
FIG. 6 is a second photograph of the line of FIG. 4.
Figure 7:
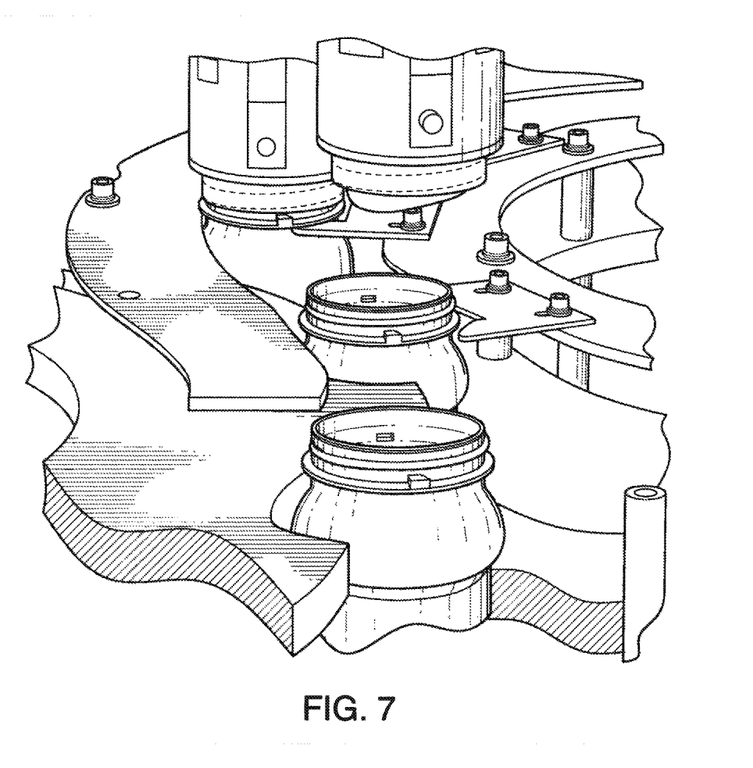
FIG. 7 is a third photograph of the line of FIG. 4.

FIGS. 5-7 show various stages of movement of the capper wheel (carrier 140) and actuation of the capper chucks to install caps 54 to bottle bodies 52. The rotation actuates the guides to engage the passing bottles. In this exemplary implementation, a slightly different guide 180 is shown having the regions 114 and 116 but lacking a curved central region 112 and smooth continuously curving transitions to the regions 114. Instead, the central region 182 is machined out as an approximate right channel for ease of manufacture. Because this region forms a non-contact gap with the nominal neck, its exact geometry is not important. In this particular implementation, the bottle necks have the OD surface 74 immediately below radially protruding circular flange 76. The lugs 72 protrude upward from the flange along the neck portion. Immediately above the lugs 72, there is an external thread for receiving an internal thread the spout fitment. In this example, the capper installs a spout fitment 56. The spout fitment may already have the cap 54 screwed into the spout fitment.

The capper chucks 402 are actuated by a downward movement and rotation to thread the spout fitment onto the bottle. Registration of the bottle base in its pocket helps allow the spout fitment to be tightened down.

Figure 8:
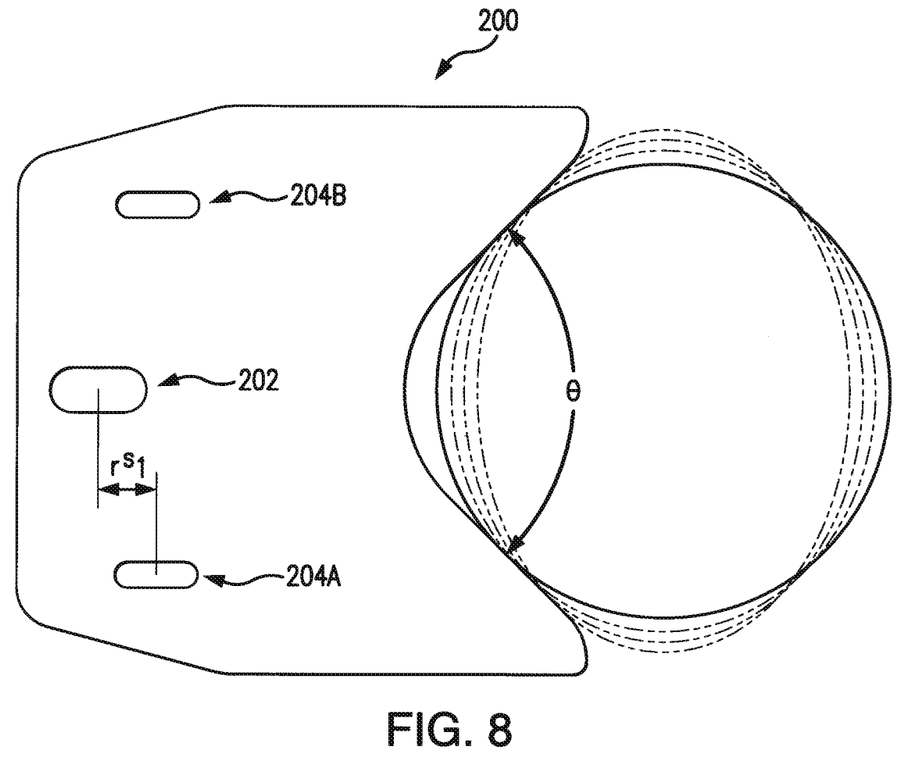
FIG. 8 is a plan view of a second inventive guide.
Figure 9:
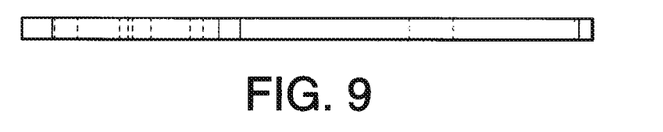
FIG. 9 is a side view of the guide of FIG. 8.

FIGS. 8 and 9 show an alternate guide 200 which may be otherwise similar to the guide 100 but with different mounting features. The exemplary mounting features comprise a central slot elongate along the plane 524 and a pair of parallel elongate slots 204A and 204B on either side thereof. Slots 204A and 204B receive protruding portions of pins or set screws pre-installed on the capper wheel. These help maintain alignment. The slot 202 receives a fastener (e.g., socket head cap screw) which extends into a threaded bore in the guide. The axes of the pins and screw may be shifted away from each other at separation distance $S_1$ allowing the plate to, slide along a range of motion between a first extreme wherein the pins and screws are at outboard/distal ends of the associated slots and a second extreme wherein they are at proximal/inboard ends of the slots. This allows tightening via a single fastener. As with the other guide, there might be further features for more permanently, positioning.

One or more embodiments of the present invention have been described. Nevertheless, it will be understood that various modifications may be made without departing from the spirit and scope of the invention. For example, when applied to the remanufacture or reengineering of a given system, or to use with a given bottle, details of the system or bottle may influence details of any particular implementation. Accordingly, other embodiments are within the scope of the following claims.

What is claimed is:

1. A bottle handling apparatus for handling bottles of a nominal neck radius, the apparatus comprising:
    a carrier; and
    a plurality of bottle guides mounted to the carrier, each bottle guide comprising a bottle-engaging recess,
    wherein the bottle-engaging recess comprises:
    means for accommodating necks of different eccentricities, said means including one of the following:
    two circumferentially-spaced contact locations 80-100° from each other with a circular neck of said nominal neck radius;
    two circumferentially-spaced contact locations separated by a non-contact gap of at least 45° with a circular neck of said nominal neck radius.

2. The apparatus of claim 1 wherein the means for accommodating necks of different eccentricities comprises:
    a central concave region of a radius of curvature less than the nominal neck radius; and
    regions outboard of the central region on opposite sides thereof having less concavity than the central region.

3. A method for using the apparatus of claim 1, the method comprising:
    passing a plurality of the bottle bodies along a flowpath; and
    actuating the carrier to engage the guides to the bottle bodies as the bottle bodies in the flowpath pass the carrier, wherein an engagement of the guides to the bottle bodies includes engaging the bottle neck to the bottle-engaging recess.

4. The method of claim 3 wherein:

the engagement provides two circumferentially-spaced contact locations 80-100° from each other with a circular neck of said nominal neck radius.

5. The method of claim 4 wherein:

a circumferential outer rail provides a third contact location.

6. The method of claim 3 wherein:

the, engagement provides two circumferentially-spaced contact locations separated by a non-contact gap of at least 45° with a circular neck of said nominal neck radius.

7. The method of claim 3 wherein:

the actuating comprises rotating the carrier.

8. The method of claim 3 further comprising:

aligning the guide to a chuck.

9. The method of claim 3 wherein:

as a first bottle passes through the apparatus, there are two spaced-apart contact locations with the guide;

as a second bottle passes through the apparatus, the second bottle neck having a greater eccentricity than the first bottle neck, there are two contact locations with the guide shifted outward along the guide recess; and as a third bottle passes through the apparatus, the third bottle neck having a greater eccentricity than the second bottle neck, there are two contact locations with the guide shifted further outward along the guide recess.

10. The method of claim 9 wherein:

the second bottle has at least 5% eccentricity and a center of the second bottle shifts radially relative to a center of the first bottle by no more than 2% of a nominal neck diameter of the first bottle.

11. The method of claim 10, wherein the center of the second bottle shifts radially relative to a center of the first bottle by no more than 1% of a nominal neck diameter of the first bottle.

12. A bottle handling apparatus for handling bottles of a nominal neck radius, the apparatus comprising:

a carrier; and a plurality of bottle guides mounted to the carrier, each bottle guide comprising a bottle-engaging recess, wherein the bottle-engaging recess comprises:

a central concave first region of a radius of curvature less than the nominal neck radius; and second regions outboard of the central region on opposite sides thereof being less concave than the central region, wherein the second regions have curvature magnitude at least 5 times the nominal neck radius, and the second regions are positioned to contact the neck for eccentricities from zero circularity to at least 5%.

13. The apparatus of claim 12 wherein:

the second regions outboard have curvature magnitude at least 10 times the nominal neck radius.

14. The apparatus of claim 12 wherein:

the second regions have curvature magnitude at least 5 times the nominal neck radius; and the second regions are positioned to contact the neck for eccentricities from zero circularity to at least 10%.

15. The apparatus of claim 12 wherein:

the second regions have curvature magnitude at least 5 times the nominal neck radius; and the second regions are positioned to contact the neck for eccentricities from zero circularity to at least 15%.

16. A bottle handling apparatus for handling bottles of a nominal neck radius, the apparatus comprising:

a carrier; and a plurality of plate-shaped bottle guides mounted to the carrier, each bottle guide comprising a bottle-engaging recess defined in a front edge thereof, wherein the bottle-engaging recess comprises means for accommodating necks of different eccentricities, said means including a central concave region of a radius of curvature less than the nominal neck radius, and regions outboard of the central region on opposite sides thereof having less concavity than the central region.

\* \* \* \* \*